Feb. 16, 1937.  W. R. GILLIES  2,070,861
WATERPROOF INSULATING MATERIAL
Filed March 29, 1935
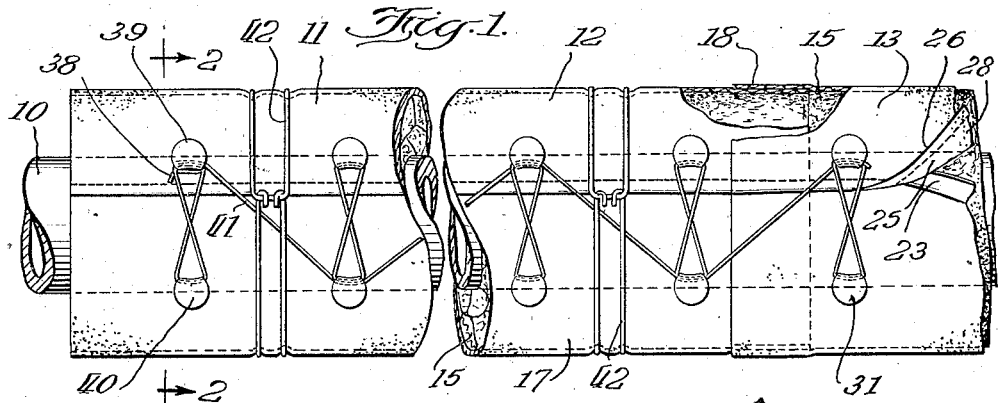
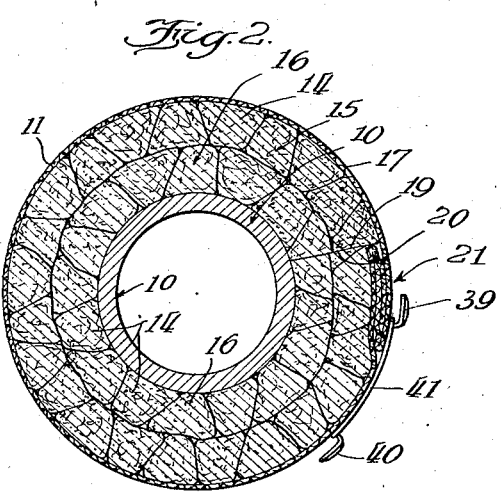
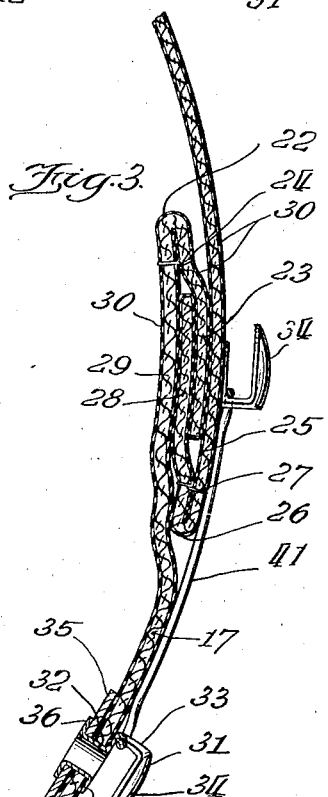
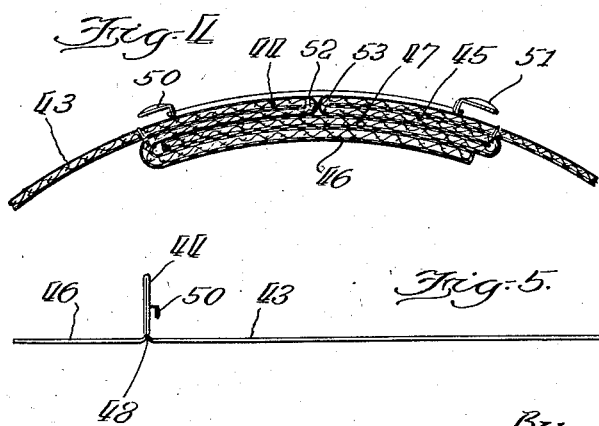
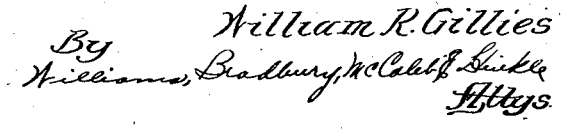
Inventor:
William R. Gillies
By
Williams, Bradbury, McCaleb & Hinkle
Attys.

Patented Feb. 16, 1937

2,070,861

UNITED STATES PATENT OFFICE 2,070,861

WATERPROOF INSULATING MATERIAL

William R. Gillies, Chicago, Ill., assignor to Union Asbestos & Rubber Company, Chicago, Ill., a corporation of Illinois Application March 29, 1935, Serial No. 13,601

4 Claims. (Cl. 154—44)

The present invention relates to waterproof insulating materials and is particularly concerned with heat insulating materials for covering pipes such as the steam pipes of railway engines and the like.

One of the objects of the invention is the provision of an improved heat insulating covering for pipes and other purposes which is of uniform heat insulating quality throughout, including the joints between successive pieces or units, and which is also waterproofed so that water cannot gain access to the insulating filling and cause its deterioration.

Another object of the invention is the provision of an improved heat insulating covering for piping which is provided with an outer waterproof layer having a joint adapted to positively prevent the entrance of water or any other liquids to the filling of the insulating material.

Another object of the invention is the provision of an improved overlapping joint for heat insulating pipe coverings of the class described, having interlocking and overlapping sections so arranged that water or any other liquid seeping into the joint is positively prevented from passing the interlocking sections of the edge of the covering, thereby assuring the provision of a waterproof joint at the edges of the covering.

Another object of the invention is the provision of a waterproof insulating covering of the class described having a filler of asbestos rovings, batting or other large, soft and loose assemblies of asbestos fibers which is economical in its construction, durable, capable of being applied to curved sections of pipes, and adapted to maintain its heat insulating qualities for a long period of time, withstanding the vibration and/or jarring which is incidental to railroad traffic.

Another object of the invention is the provision of an improved seal construction for the edges of a waterproof covering of an insulating material of the class described which may be constructed very economically by reason of the fact that it involves a minimum of labor and the use of a minimum amount of overlapping covering.

Another object of the invention is the provision of an improved mode of securing insulating covers of the class described by means of which they may be quickly attached and by means of which the permanent securement is assured although the securing wires or tension members may be broken at certain points.

Other objects and advantages of the invention will be apparent from the following description and the accompanying drawing, in which similar characters of reference indicate similar parts throughout the several views.

Referring to the single sheet of drawings accompanying this description,

Figure 1 is a side elevational view of a pipe insulated with a waterproof insulating covering constructed and applied according to the invention;

Figure 2 is a transverse sectional view taken on the plane of the line 2—2 of Figure 1 looking in the direction of the arrows;

Figure 3 is an enlarged fragmentary sectional view of the water sealing construction or waterproof joint shown at the right of Figure 2;

Figure 4 is a view similar to Figure 3 of a modification; and

Figure 5 is an end elevational view of a covering of the type shown in Figure 4 extended to show the method of manufacture of such a structure.

Referring to Figure 1, 10 indicates in its entirety a pipe to which several sections 11, 12, 13 of the waterproof insulating material have been applied. The insulating filler for the present material is preferably of the same construction as the insulating filler disclosed and/or covered by my prior Patent No. 1,875,297, issued August 30, 1932, for Heat insulating material. Thus the members 14 preferably comprise a plurality of rovings of asbestos fibers arranged side by side in a plurality of layers in such manner that the alternate layers have their joints staggered. That is, the rovings arranged in the outer layer 15 span the cracks between the rovings in the inner layer 16 and the rovings may also be arranged in overlapping relation at the edges of the material. Each roving 14 may consist of a plurality of longitudinally extending asbestos fibers which may be twisted or untwisted and which are preferably loosely held together by a plurality of asbestos cords spiralled half in one direction and half in the other direction, clockwise and counterclockwise of the roving. The rovings may be held in the form of a sheet by transversely extending threads, preferably of asbestos cord, which are loosely looped inside one roving, outside the next adjacent roving, and inside the next roving, etc.

All of the features of construction of the filling of the above mentioned Gillies patent may be employed in the present filling, but in some embodiments of the invention some of the features may be omitted and in some cases a substantially flat filling of asbestos batting may be used.

The present insulating material is provided in the shape of a flat sheet carried by the supporting covering 17 to which the sheet of rovings may be secured by any suitable cement such as, for example, a silica cement, or in other embodiments of the invention the rovings or batting may be sewed to the covering 17 or otherwise suitably secured by knotted threads.

The covering 17 preferably comprises a woven asbestos fabric formed of threads of asbestos and in some cases, depending upon the length of the fiber employed, a small amount of cotton fiber or other suitable fiber may be mixed with the asbestos to give the threads sufficient tensile strength. The fabric covering 17 may, in some cases, be constructed of ordinary fabrics of cotton or any suitable vegetable, mineral or animal fibers capable of taking the waterproofing described hereinafter, but asbestos fabric is preferably employed to increase the heat insulating value of the assembly.

The asbestos fabric covering 17 is preferably impregnated and at least covered on its outer surface with a layer of waterproofing material which may consist of an initially viscous composition comprising rubber latex with a suitable amount of solvent. In order to give the covering a suitable color carbon black or other coloring matters may also be included in the plastic composition which is forced into the fibers of the asbestos covering 17 but does not impregnate the filler 15, 16. The rubber waterproofing composition is such that the covering 17 remains flexible but it is capable of preventing access of water or other liquids to the filler 15, 16.

In some embodiments of the invention the filler and/or covering may be arranged as shown in Figure 8 of the above mentioned Gillies patent so that parts of the filler are also staggered with respect to other parts. In the more simple embodiment of the invention, however, it is only necessary to cause the insulating covering 17 to extend beyond the end of the filler 15, 16, as shown in Figure 1 at 18, a sufficient amount to overlap the waterproof covering of the adjacent section 12. The waterproof covering 17 also extends beyond the edges 19, 20 of the filler sufficiently to form the interlocking and overlapping sealing joint indicated in its entirety by the numeral 21 in Figure 2. This joint is preferably formed as shown specifically in Figures 2 and 3.

Thus, the upwardly extending edge of the covering 17 is folded downward at 22, having a downwardly extending flange 23, the fold being held by a line of stitching 24 adjacent the fold 22. In a similar manner the downwardly extending edge 25 is folded upwardly and inwardly at 26, being held by a line of stitching 27 adjacent the fold 26, thus providing an upwardly extending flange 28. The inner flap being folded outwardly and the outer flap being folded inwardly, the flange 28 may be arranged between the parts 29 and 23, whereas the flange 23 may be arranged between the parts 25 and 28.

The numeral 30 indicates the waterproofing layer appearing on the outside of the fabric in Figure 3 and this waterproofing layer may in some embodiments of the invention be provided on both sides of the fabric especially adjacent the water sealing edge 21. In any event, the waterproofing composition causes the flanges 25, 23, 28, 29 to form a waterproof joint when these parts are drawn into close contacting relation, as shown in Figure 3.

For this purpose, and for the additional purpose of drawing the insulating cover tightly about the pipe 10, the covering 17 is preferably provided with a plurality of securing devices such as, for example, the hooks 31. These hooks may be of substantially the construction comprising a tubular body 32 which passes through the fabric, an outwardly extending neck 33, and a horizontally extending head 34. The tubular body also passes through a washer 35 preferably of metal, and the end 36 of the tubular body is riveted over outside of the washer, thus clamping the fabric between the washer 35 and a washer-like formation 37 on the other end of the tube 32. These hooks are arranged to extend in the opposite directions when the covering is wrapped on the pipe substantially as shown in Figure 1. The covering may then be secured by means of a lacing which preferably takes the form of Figure 1, so that if any part of the lacing should break the other parts will hold the covering securely.

Beginning at 38 the lacing may consist of a wire which may be wrapped about the hook 39 and then down about the hook 40, extending about the hook 40 in the opposite direction. The lacing may then be brought upward again about the hook 39 making a crossed lacing for the hooks 39 and 40, after which it may be carried over diagonally, as at 41, to the next lower hook. A non-corrodible wire, such as copper, is preferably used, and such an arrangement has the advantage that the covering may always be removed if necessary for inspection of the pipes or repairs, but the insulation may be applied very quickly and it is held firmly at each pair of hooks despite the possibility of a break at any other point.

The covering may also be secured by means of the clamping wire loops 42 arranged as shown in Figure 1.

Referring, now, to Figures 4 and 5, this is a modification which employs more material and is, therefore, not so economical as the construction of Figure 3. In Figure 5 the fabric covering 43 is formed with a loop 44 and another loop 45 adjacent each edge but spaced sufficiently therefrom to leave an extending flange 46, 47, the extending flanges 46, 47 each being twice as long as the loop 44 or 45, and the loops are secured by stitching at the points 48, 49. The loops 44, 45 are provided with the same type of hooks 50, 51 and when the joint is arranged with the filler on the pipe, the joint of the fabric appears as shown in Figure 4. In this case the edges 53, 53 of the loops 44, 45 are brought into abutting relation. The extending flange 47 goes below the loop 44 but abuts the extending flange 46. When the fabric is laced together tightly, as shown in Figure 4, four layers of fabric are arranged, as shown, and compressed against each other, the waterproofing layers of these fabric flanges being in contacting relation with each other and forming a watertight seal.

It will thus be observed that should any water penetrate between the abutting edges 52, 53 the flow or leakage of the water would be positively prevented by the other overlapping flanges, and the same is true of the structure of Figure 3.

The present waterproof insulating material may be applied very quickly by reason of its improved structure and simplified securing devices, but the edges of the waterproof covering may still be made watertight without the necessity for any cement or other arrangements on account of the improved structure of the watertight seal.

While I have illustrated and described a preferred embodiment of my invention, many modifications may be made without departing from the spirit of the invention, and I do not wish to be limited to the precise details of construction set forth but desire to avail myself of all changes within the scope of the appended claims.

Having thus described my invention, what I claim as new and desire to secure by United States Letters Patent is:

1. In an insulating covering, the combination of a supporting fabric of woven asbestos with a plurality of asbestos rovings arranged in a plurality of layers carried by said fabric, said rovings being so arranged as to cause the rovings of one layer to overlap the joints between rovings of another layer, and an initially plastic waterproofing composition impregnating said asbestos fabric and providing said fabric with a waterproof layer, the edges of said fabric extending beyond said rovings and being folded backward and stitched to the body of the fabric in such manner as to form a loop, the loops of said fabric having their edges brought into abutting relation and sufficient material being provided beyond the loops to overlap the material at the opposite edge underneath the abutting loops.

2. In an insulating covering, the combination of a supporting fabric of woven asbestos with a plurality of asbestos rovings arranged in a plurality of layers carried by said fabric, said rovings being so arranged as to cause the rovings of one layer to overlap the joints between rovings of another layer, an initially plastic waterproofing composition impregnating said asbestos fabric and providing said fabric with a waterproof layer, the edges of said fabric extending beyond said rovings and being folded backward and stitched to the body of the fabric in such manner as to form a loop, the loops of said fabric having their edges brought into abutting relation and sufficient material being provided beyond the loops to overlap the material at the opposite edge underneath the abutting loops, a plurality of hooks carried by said fabric, and a wire interlacing with said hooks to secure said fabric and filler on a pipe.

3. In an insulating covering, the combination of a supporting fabric of woven asbestos with a plurality of asbestos rovings arranged to form layers of insulation, an initially plastic waterproofing composition impregnating said asbestos fabric and providing said fabric with an outer waterproof layer, the edges of said fabric extending beyond said rovings and being folded backward and stitched to the body of the fabric at the fold in such manner as to form a backwardly and inwardly extending flap on one edge and a backwardly and outwardly extending flap on the other edge, whereby each flap may be placed between the other flap and adjacent body of the fabric, and adjustable means for drawing the layers of fabric into sealing relation and for securing the covering on a pipe.

4. In an insulating covering, the combination of a supporting fabric comprising woven heat insulating fibers, with a filler layer of loosely assembled heat insulating fibres, means for securing said filler to said supporting fabric, an initially plastic water-proofing composition impregnating the fibers at the outer surface of said supporting fabric and providing said fabric with an outer waterproof layer, the edges of said supporting fabric extending beyond said filler and being folded and secured to the body of the fabric to form overlapping flaps on said edges, and means for drawing the covering about a pipe and drawing the overlapping flaps into sealing relation with each other.

WILLIAM R. GILLIES.